United States Patent Office 3,562,653
Patented Feb. 9, 1971

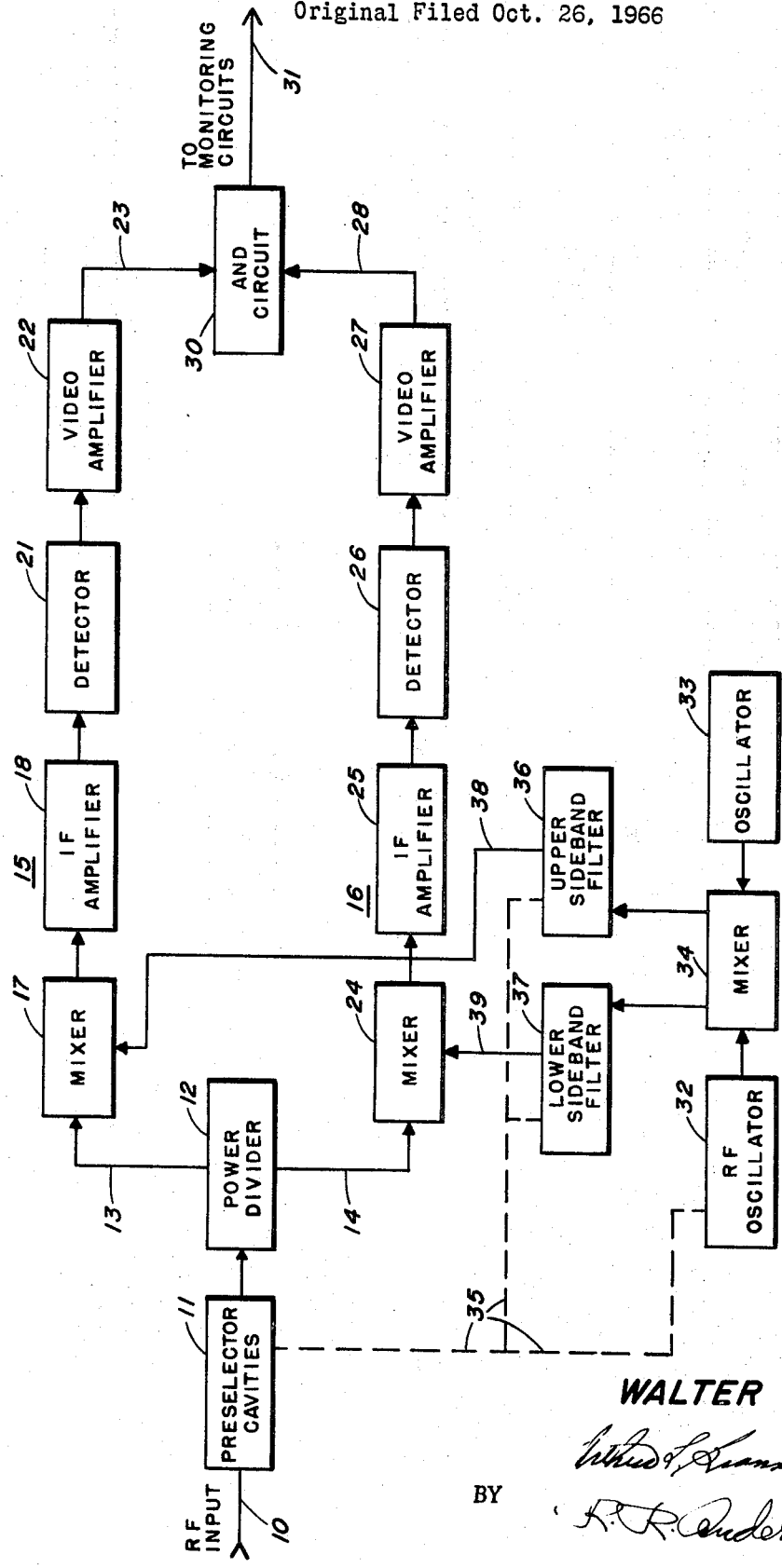

3,562,653
SPURIOUS RESPONSE FREE RECEIVER
Walter Simon, California, Md., assignor to the United States of America as represented by the Secretary of the Navy
Continuation of application Ser. No. 590,140, Oct. 26, 1966. This application May 20, 1969, Ser. No. 870,143
Int. Cl. H04b 1/12
U.S. Cl. 325—475                                    8 Claims

ABSTRACT OF THE DISCLOSURE

A system for eliminating interference and spurious responses from the output of a radio receiver which is being used as an accurate, carefully controlled test instrument. A signal under test is fed to parallel receivers, both receivers operating with the same local oscillator to produce outputs which are compared with an AND circuit. Matching signals must be presented to the AND circuit simultaneously in order for it to pass the test signal.

---

This application is a streamlined continuation application of Walter Simon, Ser. No. 590,140, filed Oct. 26, 1966, for Spurious Response-Free Receiver, now abandoned.

The invention described herein may be manufactured and used by or for the Government of the United States of America for governmental purposes without the payment of any royalties thereon or therefor.

The present invention relates to a radio receiver and, more particularly, to a radio receiver which is free from spurious responses engendered by inherent, internal anomalies present within the receiver itself.

It is a commonly known and accepted fact that since the inception of radio it has been the desire and ambition of engineers, radio technicians and others to find a practical way for eliminating interference and spurious responses from the output of radio receivers, whether this interference and spurious responses are from natural or manmade sources. On many occasions a true and uncluttered response from receivers is not only highly desirable, but it is almost mandatory and this is particularly the case where delicate measurements and testing is being performed. No accurate testing can be consummated without reliable and trustworthy test equipment.

It may be important at this point to define "spurious response" as used hereinafter in the application. The dictionary defines "spurious" as "false; in any system, descriptive of undesired response similar to the desired response, but resulting from malfunction or interference." Also "spurious response" as ". . . the response of an electric transducer or device other than the desired response."

In many types of test equipment it is important to know if the output of a receiver is that which is shown by the tuning dial and as produced by the fundamental frequency of the local oscillator, or wether the output is a spurious response as produced by some harmonic of the local oscillator. On its face, the output in both siutations is the same and in the absence of some system to eliminate the spurious responses, the engineer has no means of knowing whether the response is true or false.

Current radio frequency interference (RFI) receivers and field intensity meters (FIM) utilized in the investigation of radiation fields are themselves subject to spurious response problems. Data collected with these devices must be exhaustively analyzed to determine if the results obtained truly represent the area under measurement or include anomalies introduced by the test instrument.

Present methods of examining data obtained with an FIM, for example, for spurious responses introduced by the FIM itself include:

(a) reduction of the input signal by a known amount of attenuation. If the output is a true representation of the input, then the output will also be attenuated by the same factor as the input. An FIM spurious response, on the other hand, will not decrease in proportion to the attenuation of the input signal.

(b) filtering of that portion of the spectrum containing signal levels that might overload the receiver front end. For example, assume an emission spectrum with a peak power output centered at 1.3 gigacycles per second. Assume that when scanning the spectrum with an FIM several large amplitude responses are found in the 8.0 gigacycle region. To determine if the 1.3 gigacycle signal might be inducing FIM responses showing at 8.0 gigacycles, a 3.0 gigacycle high pass filter would be inserted in series with the input, thereby preventing the 1.3 gigacycle signal from entering the receiver. After insertion of the filter, the 8.0 gigacycle region would again be examined. Presence of the signal at 8.0 gigacycles indicates that the test instrument is not affecting the results, while absence of the signal indicates that the response was caused by test equipment itself.

Methods (a) and (b) are time consuming and although they lead to identification of the spurious signal, they require extra calibration data of the accessory attenuators and filters.

The present invention, on the other hand, offers a method of improving the response of receivers which is not only extremely accurate, but is continuous in its operation and does not reduce the strength of the desired signal.

It is an object of the present invention to present a spurious response free radio receiver.

Another object of the present invention is the provision of a spurious response free receiver which is continuous in operation.

Yet another object of the present invention is the provision of a spurious response free receiver which eliminates interference, but does not reduce the strength of the desired signal.

Still another object of the present invention is the provision of a spurious response free receiver which utilizes parallel signal processing channels, the output of these channels being combined so as to cancel out the unwanted interference.

Another object of the present invention is the provision of a spurious response free receiver which utilizes the upper and lower side bands from a local oscillator to beat against the signal in parallel receiver channels as a means of canceling out undesirable interference.

Other objects and many of the attendant advantages of the present invention will be readily appreciated as the same becomes better understood by reference to the following detailed description when considered in connection with the accompanying drawing wherein:

The figure shows a block diagram of the receiver.

Referring now to the drawing, there is shown an RF input lead 10 which feeds into a preselector cavity 11, this cavity being of any familiar design that is tuned to pass only a narrow, predetermined bandpass of frequencies. The output of preselector 11 is applied to a power divider 12 having dual output leads 13 and 14, each of these leads carrying the same frequency ($f_0$) as that received on input lead 10.

From the power divider 12 the signal ($f_0$) is applied over output leads 13 and 14 to identical parallel receiver channels, shown generally as 15 and 16. On channel 15 the input signal ($f_0$) is applied via lead 13 to a mixer 17, followed in turn by an IF amplifier 18, a detactor 21 and a video amplifier 22 to an output lead 23. On channel 16 the input signal ($f_0$) is applied via lead 14 to a mixer 24, followed in turn by an IF amplifier 25, a detector 26 and a video amplifier 27 to an output lead 28. Leads 23 and 28 form inputs to an AND circuit 30 where the signals from receiver channels 15 and 16 are combined to produce a composite output on lead 31, this composite output being utilized by monitoring equipment, not shown.

Separate from receiver channels 15 and 16 there is an oscillator arrangement consisting of a variable oscillator 32 and a mixed frequency oscillator 33. Variable oscillator 32 is connected by a gang arrangement 35 to the preselector cavity 11 so that these components track together and the output of oscillator 32 is the same frequency as the input frequency of interest or $f_0$. Oscillator 33, on the other hand, has an output of 30 megacycles.

The output of oscillators 32 and 33 are joined and beat together in a mixer 34 so as to form upper and lower side band frequencies, these frequencies being passed through filters 36 and 37. Filter 36 is designed to pass the upper side band, which in this case is ($f_0+30$) while filter 37 passed the lower side band or ($f_0-30$). Both filters 36 and 37 are connected to the gang arrangement 35 so that they also track, along with preselector cavity 11 and oscillator 32. The upper side band frequency ($f_0+30$) as passed by filter 36 is connected via lead 38 to mixer 17 of receiver channel 15 where it beats with the frequency of interest ($f_0$). The lower side band frequency ($f_0-30$) as passed by filter 37 is connected via lead 39 to mixer 24 of receiver channel 16 where it beats with the frequency of interest ($f_0$).

Turning now to the theory of operation of the device, the accompanying block diagram illustrates a spurious response free receiver whose operation is based upon the following spurious response equation:

$$f_{SP} = \frac{Pf_{LO} \pm f_{IF}}{q}$$

where:

$f_{SP}$=receiver spurious response frequency
$f_{LO}$=receiver local oscillator frequency
$f_{IF}$=receiver IF frequency
$q$=integer (not zero) denoting harmonic order of the mixer input signal
$P$=integer (or zero) denoting harmonic order of local oscillator.

Note that receiver spurious responses are a function of the local oscillator frequency ($f_{LO}$) and that any two receivers, each with a different $f_{LO}$, will not have a spurious response at the same frequency.

The receiver outlined in the drawing essentially consists of two parallel receivers whose outputs are combined in an AND circuit 30. Signals must be present at both AND input leads 23 and 28 for an output to be passed on to the monitoring circuits over lead 31. A spurious response induced in one receiver channel, as 15, for example, will produce a signal on lead 23 to the AND circuit; the signal on the other input, on lead 28, containing the spurious-free content of the other receiver channel, 16, will not match the spurious content of the first. Hence, the output of AND circuit 30 will not pass the spurious responses of either receiver channel, unless coincidence ocurs, which is extremely unlikely.

The two receiver channels 15 and 16 obtain their local oscillator inputs from mixer 34 which produces upper and lower sidebands that are channeled to mixer units 17 and 24 by means of tuned filters 36 and 37. An RF oscillator 32, which tracks with the main preselector cavity 11, is tuned to the frequency of interest ($f_0$), this frequency then beating with the output of oscillator 33 in mixer 34 to produce the sidebands. The sidebands ($f_0+30$) and ($f_0-30$) are then in turn used to act as local oscillators for the two receiver channels 15 and 16 beating against an input signal of ($f_0$) on leads 13 and 14. The resulting IF signals in each receiver channel, which will be 30 megacycles is then amplified by 18 and 25, detected by 21 and 26, amplified again by amplifiers 22 and 27, and finally applied to AND circuit 30. If spurious response free signals are present on both leads 23 and 28, then an output will be presented on lead 31 for the monitoring circuits.

In order to further illustrate the operation of the present invention and to pinpoint the manner in which the spurious responses are eliminated the following table of sample readings is given:

| Receiver #1 | | | Receiver #2 | | |
|---|---|---|---|---|---|
| $f_{IN}$ | $f_{LO}$ | $f_{IF}$ | $f_{IN}$ | $f_{LO}$ | $f_{IF}$ |
| 100<br>160 | 130 | 30 | 40<br>100 | 70 | 30 |
| 230<br>290 | 260 | 30 | 110<br>170 | 140 | 30 |
| 360<br>420 | 390 | 30 | 180<br>240 | 210 | 30 |

Assume that the tuning dial on the receiver is turned to have $f_{IN}$ as 100 mc., then oscillator 32 is 100 mc. and oscillator 33 is 30 mc., producing an upper sideband from mixer 34 as ($f_{IN}+30$) or 130 mc. for $f_{LO}$ to receiver #1 mixer 17. Thus, receiver #1 will have a 30 mc. output if the $f_{IN}$ is 100 mc. or 160 mc. for an $f_{LO}$ of 130, or if $f_{IN}$ is 230 or 290 for second harmonic 260, or if $f_{IN}$ is 360 or 420 for third harmonic 390. Now, since the dial is set for $f_{IN}$ to be 100 mc., the only true spurious-free response would be for $f_{LO}$ to be 130 mc., while all of the other frequencies, namely, those enclosed in the dotted lines as 160, 230, 290, 360 and 420 would all be spurious responses.

The same theory applies to receiver #2 except that in this case $f_{LO}$ is ($f_{IN}-30$) or 70 mc. and the frequencies, 40, 110, 170, 180 and 240 would be spurious responses.

It can be seen then that the spurious response frequencies for the two receivers are completely different and there will be coincidence at only one point. Therefore, since the output of both receivers feed into AND circuit 30, there will be an output on lead 31 to the monitoring circuits only when $f_{IN}$ is 100 mc.

The preselector 11, as well as the upper sideband filter 36 and lower sideband filter 37, can be YIG units, designed to track together. Design of the RF oscillator 32, which must also track, would likewise contain a YIG unit.

While the IF frequency used in the present description was given as being 30 megacycles, this does not necessarily mean it is the optimum value because the actual frequency (possibly 160 megacycles) will depend upon the final design of the test instrument utilizing the invention.

The preselector 11 feeds into the power divider 12 which, in splitting the signal into the two input mixers 17 and 24, will cause a slight loss in sensitivity. However, this loss is in the order of magnitude of only 3 db which is inconsequential.

From the above description of the structure and operation of the device it is clear that the invention presents a vast improvement in the art of spurious response free receivers in that delicate test equipment may be utilized with the assurance that inherent receiver errors are not being superimposed on the test signal.

I claim:

1. A spurious response-free receiver comprising
    input means;
    preselector cavity means connected to the input means
        for passing only a specific frequency of interest;

divider means connected to the preselector cavity means for dividing the output of the preselector cavity means into first and second equal signals;

a first receiver channel connected to receive the first signal;

a second receiver channel connected to receive the second signal;

sideband generating means having more than one oscillator for applying a beat frequency to the first and second receiver channels; and means for receiving the outputs of the two receiver channels to pass a signal if like outputs are simultaneously presented by both receivers.

2. The spurious response-free receiver of claim 1 wherein the divider means comprises a power divider.

3. The spurious response-free receiver of claim 2 wherein the first receiver channel comprises a mixer, an IF amplifier, a detector and another amplifier.

4. The spurious response-free receiver of claim 3 wherein the second receiver channel comprises a mixer, an IF amplifier, a detector and another amplifier.

5. The spurious response-free receiver of claim 4 wherein the sideband generating means comprises a variable RF oscillator and a fixed frequency oscillator both feeding into a mixer, said mixer having an upper sideband output and a lower sideband output;

filter means for each of the sideband outputs;

means for connecting the upper sideband filter to the mixer of the first receiver channel; and means connecting the lower sideband filter to the mixer of the second receiver channel.

6. The spurious response-free receiver of claim 5 wherein the variable RF oscillator and the two sideband filters are ganged to the preselector cavity means so that they all track together.

7. The spurious response-free receiver of claim 6 wherein the means for receiving the outputs of the two receiver channels comprises an AND circuit.

8. The spurious response-free receiver of claim 7 wherein the operation of the receiver channels is based upon the following spurious response equation:

$$f_{SP} = \frac{P f_{LO} \pm f_{IF}}{q}$$

where:

$f_{SP}$ = receiver spurious response frequency
$f_{LO}$ = receiver local oscillator frequency
$f_{IF}$ = receiver IF frequency
P = integer (or zero) denoting harmonic order of local oscillator
q = integer (not zero) denoting harmonic order of the mixer input signal.

References Cited

UNITED STATES PATENTS 2,964,622   12/1960   Fire.

RICHARD MURRAY, Primary Examiner

U.S. Cl. X.R.

325—305, 483